(12) United States Patent
Klein et al.

(10) Patent No.: US 11,902,300 B2
(45) Date of Patent: Feb. 13, 2024

(54) METHOD FOR MONITORING A DATA TRANSMISSION SYSTEM, DATA TRANSMISSION SYSTEM AND MOTOR VEHICLE

(71) Applicant: AUDI AG, Ingolstadt (DE)

(72) Inventors: Markus Klein, Pförring (DE); Kamil Zawadzki, Munich (DE); Changsup Ahn, Ingolstadt (DE); Wolfgang Stadler, Emmendingen (DE); Karsten Schmidt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 426 days.

(21) Appl. No.: 17/291,952

(22) PCT Filed: Nov. 25, 2019

(86) PCT No.: PCT/EP2019/082353
§ 371 (c)(1),
(2) Date: May 6, 2021

(87) PCT Pub. No.: WO2020/109200
PCT Pub. Date: Jun. 4, 2020

(65) Prior Publication Data
US 2022/0006822 A1    Jan. 6, 2022

(30) Foreign Application Priority Data
Nov. 27, 2018   (DE) ...................... 10 2018 220 324.5

(51) Int. Cl.
*H04L 9/00*    (2022.01)
*H04L 9/40*    (2022.01)
(Continued)

(52) U.S. Cl.
CPC .......... *H04L 63/1416* (2013.01); *H04L 12/40* (2013.01); *H04L 63/08* (2013.01); *H04L 67/12* (2013.01)

(58) Field of Classification Search
CPC ......... H04L 67/12; H04L 63/08; H04L 12/40; H04L 63/1416
(Continued)

(56) References Cited

U.S. PATENT DOCUMENTS 6,931,524 B2   8/2005   Ehmann et al.
8,379,850 B1   2/2013   Bridgford et al.
(Continued)

FOREIGN PATENT DOCUMENTS

CN   103748838 A   4/2014
CN   104885414 A   9/2015
(Continued)

OTHER PUBLICATIONS

International Search Report and Written Opinion of the International Searching Authority directed to related International Patent Application No. PCT/EP2019/082353, dated Jan. 14, 2020, with attached English-language translation; 15 pages.
(Continued)

*Primary Examiner* — Josnel Jeudy
(74) *Attorney, Agent, or Firm* — Sterne, Kessler, Goldstein & Fox P.L.L.C.

(57) ABSTRACT

An approach for monitoring a data transmission system that uses a data transmission means such as a vehicle bus or a vehicle network of a motor vehicle. This system includes a monitoring device that transmits a request message to a transmitting device and to a receiving device. The transmitting device generates a particular transmitter response on the basis of the request message, where the transmitter response is transmitted to the monitoring device. The receiving device generates a particular receiver response on the basis of the request message, where the receiver response is transmitted to the monitoring device. The monitoring device receives the transmitter response and the receiver response and checks compliance with a trigger condition which depends on the transmitter response and the receiver response, the compliance of which indicates an event relevant to monitoring.

15 Claims, 2 Drawing Sheets

(51) Int. Cl.
*H04L 12/40* (2006.01)
*H04L 67/12* (2022.01)

(58) Field of Classification Search
USPC .......................................................... 726/3
See application file for complete search history.

(56) References Cited

U.S. PATENT DOCUMENTS

| | | | |
|---|---|---|---|
| 9,485,327 | B2 | 11/2016 | Hasse |
| 10,146,725 | B2 | 12/2018 | Hartwich et al. |
| 10,389,744 | B2 | 8/2019 | Hartkopp et al. |
| 10,681,540 | B2 | 6/2020 | Takemori et al. |
| 2012/0278477 | A1 | 11/2012 | Terrell et al. |
| 2015/0191151 | A1 | 7/2015 | Ben Noon et al. |
| 2017/0353944 | A1* | 12/2017 | Kim ................. H04W 4/06 |
| 2018/0229739 | A1 | 8/2018 | Imamoto et al. |

FOREIGN PATENT DOCUMENTS

| | | |
|---|---|---|
| CN | 106464499 A | 2/2017 |
| CN | 107431709 A | 12/2017 |
| DE | 60222274 T2 | 1/2008 |
| DE | 102013214018 A1 | 1/2015 |
| EP | 2892199 A1 | 7/2015 |
| EP | 3113529 A1 | 1/2017 |

OTHER PUBLICATIONS

International Preliminary Report on Patentability directed to related International Patent Application No. PCT/EP2019/082353, completed Feb. 18, 2021 with attached English-language translation; 13 pages.

* cited by examiner

METHOD FOR MONITORING A DATA TRANSMISSION SYSTEM, DATA TRANSMISSION SYSTEM AND MOTOR VEHICLE

TECHNICAL FIELD

The disclosure relates to a method for monitoring a data transmission system.

BACKGROUND

Complex EDP systems have become an indispensable part of modern motor vehicles. Although this development represents, on the one hand, a significant improvement in terms of driving comfort, EDP systems, on the other hand, harbor the risk of errors, in particular when they are vulnerable to malware.

Approaches for improving or increasing the security of EDP systems, in particular in motor vehicles, are already known from the prior art. For example, DE 602 22 274 T2 proposes a concept for monitoring a circuit arrangement comprising a CPU circuit which is connected to various bus communication devices via a communication bus. For this purpose, a reconfigurable circuit is connected to the communication bus, which is reconfigured by the CPU circuit as a function of an event or event type occurring on the communication bus, in order to monitor the event accordingly and to provide feedback to the CPU circuit.

DETAILED DESCRIPTION

The disclosure relates to a method for monitoring a data transmission system comprising at least one transmitting device for transmitting messages, at least one receiving device for receiving the messages, a data transmission means for transmitting the messages and a monitoring device, wherein the data transmission means is, in particular, a vehicle bus or a vehicle network of a motor vehicle.

Complex EDP systems have become an indispensable part of modern motor vehicles. Although this development represents, on the one hand, a significant improvement in terms of driving comfort, EDP systems, on the other hand, harbor the risk of errors, in particular when they are vulnerable to malware.

In order to allow for a corresponding exchange of data between the transmitting components and receiving components or devices of a data transmission system, these are connected to one another via a transmission means, which can typically be a data bus or a network suitable for this purpose. In this context, a possible security gap is conceivable in particular in the context of the after-market field, i.e. for example, in the maintenance of the motor vehicle. Thus, during maintenance, a reading device is often connected to the transmission means in order to read out and analyze relevant data that may have been stored in advance while the motor vehicle is in use. However, malware or the like can get into the system via the reader.

Another problem, particularly with regard to the after-market field in motor vehicles, is that third-party devices could possibly be connected to the data transmission system, which is not absolutely desirable from the point of view of the respective vehicle manufacturer. The customer naturally has an interest in using original parts for repairs in the context of maintenance or inspection work. In addition, the installation of third-party devices can be relevant in the event of a warranty claim since this could possibly result in an exclusion of the warranty. Often, however, the connection of such devices, e.g. as media players, should not be prevented. However, malfunctions or security gaps in these devices, which could disrupt robust communication via a bus or network, cannot be ruled out since the vehicle manufacturer cannot perform quality control for third-party devices. It is therefore desirable to be able to identify such external devices or generally undesirable behavior of connected devices with as little effort as possible.

Approaches for improving or increasing the security of EDP systems, in particular in motor vehicles, are already known from the prior art. For example, DE 602 22 274 T2 proposes a concept for monitoring a circuit arrangement comprising a CPU circuit which is connected to various bus communication devices via a communication bus. For this purpose, a reconfigurable circuit is connected to the communication bus, which is reconfigured by the CPU circuit as a function of an event or event type occurring on the communication bus, in order to monitor the event accordingly and to provide feedback to the CPU circuit.

The object on which the disclosure is based is to provide a possibility of optimizing or simplifying a data transmission system, in particular with regard to monitoring the data or messages transmitted via the data transmission system.

The object is achieved by a method of the type mentioned at the outset, wherein the monitoring device transmits a request message to the transmitting device and to the receiving device, the transmitting device or at least one of the transmitting devices generates a particular transmitter response on the basis of the request message and at least one transmitter message transmitted by the particular transmitting device via the data transmission means and transmits said transmitter response to the monitoring device, the receiving device or at least one of the receiving devices generates a particular receiver response on the basis of the request message and at least one receiver message received by the particular receiving device via the data transmission means and transmits said receiver response to the monitoring device, and the monitoring device receives the transmitter response and the receiver response and checks compliance with a trigger condition which depends on the transmitter response and the receiver response, the compliance of which indicates an event relevant to monitoring.

In other words, the monitoring device transmits the request message to, for example, a transmitting device and a receiving device. The transmitting device then generates a transmitter response and the receiving device generates a receiver response, the transmitter response depending on transmitter messages that were transmitted in particular after receiving the request message, and the receiver response depending on receiver messages that were received in particular after receiving the request message. The receiver messages are expediently selected in this case in such a way that, when the data transmission system is operated as expected, they correspond to the transmitter messages received by the receiving device. A central purpose to be met when evaluating the trigger condition is to make a comparison between what was transmitted by the transmitting device and what was received by the receiving device as simple as possible and with little effort, based on a comparison between the transmitter response and the receiver response. The trigger condition can in this case be met in particular when it is recognized on the basis of this comparison that the transmitter messages do not arrive at the receiving device or are falsified, or that a receiver message was received that does not correspond to any transmitter messages.

This comparison makes it possible to identify discrepancies between the transmitter messages and the receiver messages, which can be traced back to an error in the data transmission system, in particular to a malfunction or manipulation of the data transmission system and/or a connected component, by evaluating the trigger condition. The present disclosure therefore provides a concept that allows for effective monitoring of the data transmission system, for example within a motor vehicle, without great effort. It is preferably provided that the message comparison does not take place on the basis of the complete messages or complete message fields, but rather takes place on the basis of the message-dependent and expediently much more compact transmitter response or receiver response, which in contrast results in a significant reduction in data transmission and computing effort. This applies above all to permanent monitoring of the data transmission system, which previously typically required a high level of effort in terms of computing power or data transfer, for example, which is overcome within the scope of the present disclosure, in particular if the data transmission system is to be checked on a random basis.

The request message, the transmitter response, and the receiver response can expediently be transmitted via the data transmission means that are already present. It is equally conceivable that the transmitting device and the receiving device are connected to the monitoring device via a further data transmission means.

It can be provided that the request message is encrypted and/or transmitted with authentication from the monitoring device to the transmitting device and/or the receiving device, and/or that the transmitter response and/or the receiver response is encrypted and/or transmitted with authentication from the transmitting device and/or the receiving device to the monitoring device. In this way, when transmitting the request message or the transmitter response or the receiver response, the respective transmitting device can be authenticated, the receiving device being able to check the authentication accordingly and discard the message if the authentication fails. In addition, it can be provided that the request message or the transmitter response or the receiver response is or are encrypted, the receiving device decrypting the message.

This results in a further increase in the security of the data transmission system since messages generated by the authentication and/or the encryption of third-party devices and/or by malicious software can be filtered out and also identified. In other words, the encryption prevents the request message from being received by unauthenticated components that could be connected to the data transmission system, thereby reducing the risk of manipulation.

In the context of the method according to the disclosure, it can be provided that the data transmission system comprises a plurality of transmitting devices and/or receiving devices, the request message being transmitted as a broadcast to all transmission devices and receiving devices of the data transmission system. In this case, it is not necessary for the monitoring device to transmit the request message explicitly, for example, to establish a separate data transmission to selected transmitting devices or receiving devices, but rather the request message can simply be transmitted via the data transmission medium to all transmitting devices or receiving devices that are connected to one another via the data transmission means.

The messages transmitted from the transmitting devices to the receiving devices via the data transmission means can typically have a respective message type. In other words, messages with different message types can be transmitted via the data transmission means. Message types can, for example, describe the function of the respective message, wherein messages of a specific message type can in particular be transmitted only by parts of the transmitting devices and can be received only by parts of the receiving devices. Often, one specific message type also only affects one specific pair of one transmitting device and one receiving device. In addition, it is often provided that specific transmitting devices or receiving devices can only process a specific message type. It is also conceivable that messages of different message types are also transmitted or received by the same transmitting device or receiving device. As an example of this, a control device for carrying out an autonomous operation of the or of one motor vehicle is conceivable, since the control device receives and transmits message types that relate, for example, to the braking system, the drive, the steering, etc., i.e. different message types.

According to the disclosure it can be provided that transmitter messages having different message types are transmitted by the transmitting device or the transmitting devices and receiver messages having different message types are received by the receiving device or the receiving devices, the request message specifying at least one type information describing the message type, it being dependent on the type information on which transmitter message type the transmitter response is attached to and/or on which receiver message type the receiver response depends and/or on which transmitting device the transmitter response is generated and/or on which receiving device the receiver response is generated. A conceivable message type can be that the messages on the basis of which the transmitter response or the receiver response are generated relate to the engine control. Another message type can be, for example, that the messages on the basis of which the transmitter response or the receiver response are generated relate to an entertainment system of the motor vehicle.

Message types can additionally or alternatively also be defined with regard to the criticality or priority of the respective transmitter or receiver messages. For example, critical messages, in other words messages with a comparatively high priority, can relate to the control of a security system or a braking system of the motor vehicle, whereas uncritical messages can relate to the air conditioning system or heater of the motor vehicle, for example.

The message type can also be defined by which transmitting device or which receiving device generates the transmitter response or receiver response. For example, it is conceivable that certain message types are transmitted or received exclusively by a specific transmitting device or receiving device. An example of this is the message type "windshield wiper system," an actuator of a windshield wiper of the motor vehicle representing a receiving device which exclusively receives receiver messages of this message type.

It can be provided that fixed frequency factors can be provided for different message types. The frequency factor can in particular indicate how often the respective message type is to be monitored by the monitoring device or, in other words, how large an, in particular average, time interval is that lies between two checking processes of the respective message type.

As an illustrative example of this, it is conceivable that the frequency factor 1 is assigned to the message type "windshield wiper system," whereas the frequency factor 10 is assigned to the message type "brake system." This means that the monitoring of transmitter messages or receiver messages relating to the brake system takes place ten times as often as the monitoring of transmitter messages or receiver messages relating to the windshield wiper system of the motor vehicle.

It is particularly expedient in this case if message types relating to transmitter messages or receiver messages that are assigned to a comparatively important vehicle function, such as the braking system or an autonomous driving operation of the motor vehicle, are monitored more frequently than message types that are assigned to a less relevant vehicle function, such as an infotainment system, an interior lighting of the motor vehicle, or the like.

According to the disclosure, it can also be provided that transmitter messages from a plurality of transmitting devices and/or receiver messages from a plurality of receiving devices can be transmitted via the data transmission means, the transmitting devices and/or receiving devices each having an assigned network address, the request message containing at least one address information describing a network address, it being dependent on the address information on which transmitter messages the transmitter response depends and/or on which receiver messages the receiver response depends and/or which transmitting device generates the transmitter response and/or which receiving device generates the receiver response. This is based on the basic idea that the selection of the transmitting device that generates the transmitter response or the receiving device that generates the receiver response is not or is not only based on the or on one message type, but instead is made component-specific, wherein each component, i.e. each transmitting device or receiving device, is assigned its own address. A direct selection of individual transmitting devices or receiving devices is hereby made possible in a simple manner. This can be particularly advantageous if no higher-level protocol is used in the context of which specific message types are defined, for example if an Ethernet is to be monitored directly.

With regard to the request message, it can be provided that it contains a sampling number, the number of transmitter messages and receiver messages, on the basis of which the transmitter response and receiver response are generated, depending on the sampling number. For example, the sampling number can be 100, which means that the transmitter response is generated on the basis of 100 transmitter messages and the receiver response is generated on the basis of 100 receiver messages.

It can particularly preferably be provided that the transmitting device transmits a plurality of transmitter messages in succession, the transmitter response comprising a first transmitter information and a second transmitter information, the second transmitter information depending on at least one transmitter message that is transmitted subsequently to all transmitter messages on which the first transmitter information depends, and/or that the receiving device receives a plurality of receiver messages in succession, the receiver response comprising a first receiver information and a second receiver information, the second receiver information depending on at least one receiver message that is received subsequently to all receiver messages, on which the first receiver information depends.

This principle is to be explained, without restricting the generality, by way of the following example. If the sampling number is 10, for example, then the first transmitter information can depend on the first ten transmitter messages that are transmitted after the request message has been received. In contrast, the second or, if appropriate, additionally a third transmitter information can depend on the second to eleventh or third to twelfth transmitter messages that are transmitted after the request message has been received. This principle can be continued at will. This applies analogously to the first, second and, if applicable, third receiver information. This can solve the problem that the transmission of the request message to the transmitting device and the receiving device and/or the processing of the request message in the transmitting device and the receiving device could take different lengths of time, so that the transmitter messages, on the basis of which the transmitter response is generated, may no longer be assigned to the receiver messages, on the basis of which the receiver response is generated, and therefore the trigger condition is incorrectly met.

It can thus be provided that the first transmitter information is compared with the first receiver information. If this does not lead to a match or if these messages do not have a predefined relationship, then this does not necessarily have to mean that there is a reason justifying the compliance of the trigger condition, but that only due to the above-explained possibility of the different lengths of transmission or processing times in the transmitting device and the receiving device the first receiver information is based on a set of messages which does not correspond to the set of messages on which the first transmitter information is based. In order to check this, the first transmitter information can then be compared with the second receiver information and the second transmitter information can be compared with the first receiver information. The trigger condition can only be met if no match or no existence of the predefined relationship is recognized.

In this way, however, it may not be possible to prevent the trigger condition from being met incorrectly due to a comparatively large difference between the transmission or processing time in the transmitting device and the receiving device. In order to solve this problem, it can be provided, based on the principle just explained, that the transmitter message contain further transmitter information and the receiver message contain further receiver information, which is evaluated accordingly. The greater the number of pieces of transmitter information and receiver information provided, the greater the difference can be between the transmission or processing time in the transmitting device and the receiving device without the trigger condition being incorrectly met.

It can be provided according to the disclosure that a point in time at which the monitoring device transmits the request message to the transmitting device and the receiving device, in particular the time interval between two transmitted request messages and/or the sampling number, is determined randomly. It is particularly expedient here if the time interval between two transmitted request messages is selected randomly from a predetermined time interval. This ensures that the monitoring cycles do not take place at regular intervals and consequently the point in time at which monitoring will take place cannot be predicted, which makes a possible manipulation of the monitoring of the data transmission system more difficult.

In addition, it can be provided in the method according to the disclosure that the transmitting device transmits the transmitter response regarding the generation of the transmitter response after the lapse of a waiting time to the monitoring device and/or that the receiving device transmits the receiver response regarding the generation of the receiver response after the lapse of a waiting time to the monitoring device. The waiting time can be fixed or determined randomly. Although it can also be provided that the transmission of the transmitter response and/or the receiver response takes place immediately after the generation of the transmitter response or the receiver response, the time delay makes it difficult to intercept and manipulate the transmitter response and/or the receiver response by, for example, malware. Especially if the time delay is determined randomly, the point in time of transmitting the transmitter response and/or the receiver response cannot be determined in advance, which makes these messages more difficult to manipulate.

In the event that the transmitter response and/or receiver response is not received after transmitting the request message, a previously defined timeout value can be provided. If, after transmitting the request message, a period of time specified by the timeout value has elapsed without the transmitter response and/or receiver response having reached the monitoring device, the respective monitoring process can be aborted and further measures can be initiated, in particular, depending on the respective message type. Another measure here can be that the request message is transmitted again and/or that logging of the absence is carried out. A possible absence of the transmitter response or the receiver response does not necessarily have to be due to a malfunction, but can instead only be due to a high data transfer or the like.

It is also conceivable that the transmitter response contains one or more pieces of transmitter information, the calculation of which is carried out by applying a commutative operation to at least parts of the transmitter messages on which the transmitter response depends, or to information fields of these transmitter messages, and in that the receiver response contains one or more pieces of receiver information, the calculation of which is carried out by applying a commutative operation to at least parts of the receiver messages on which the receiver response depends, or to information fields of these receiver messages, the trigger condition being met if the transmitter information and the receiver information are different or have no predetermined relationship or if none of the transmitter information matches or has a specified relationship with one of the recipient information. The information fields can be, for example, checksums of the individual messages, content fields or the like.

It is particularly conceivable that the pieces of transmitter information or the piece of transmitter information or the pieces of receiver information or the piece of receiver information is/are generated on the basis of the principle of the cyclical redundancy check (CRC). In this case, it can be particularly expedient that the pieces of transmitter information or the piece of receiver information, which consequently represent or represents a checksum, is specified as a modulo of a previously defined, natural number. If the natural number is chosen to be sufficiently large, it can be avoided that a difference between the transmitter information and the receiver information—which difference only arose from the modulo calculation due to a coincidental match of the checksums—remains undetected. As a further alternative to this, it is conceivable that the checksum or the transmitter/receiver information is generated on the basis of an XOR link.

By determining the transmitter information with the aid of a commutative operation, it is avoided that the transmitter information changes due to a changed order in which the transmitter messages are transmitted. Likewise, by determining the receiver information by a commutative operation, it is avoided that the receiver information changes due to a changed order in which the receiver messages are received.

It is also conceivable that instead of the checksum a check value is used which is generated on the basis of non-commutative operations, in particular using at least one S-box. In addition, it is conceivable that another test value that is suitable for such a comparison and that is dependent on the transmitter messages or receiver messages, or possibly even all of the transmitter messages or receiver messages, is used. Another possibility for determining the transmitter information or the receiver information is to calculate a hash value from the input variables mentioned.

In the case of compliance with the trigger condition, it can be provided that logging of event information describing the event relevant to monitoring and/or transmitting the event information to a vehicle-external device and/or outputting a warning signal to a user, in particular a driver of a motor vehicle, which comprises the data transmission means, and/or decommissioning and/or modifying a function affected by the event relevant to monitoring, in particular a vehicle function of the motor vehicle, takes place. The logging makes it possible, for example, to read out the logs during the next maintenance of the motor vehicle, so that an evaluator can assess the events relevant to monitoring and decide on any necessary measures and initiate them. Logging can be carried out by any controller of the motor vehicle. In order to allow for information to be provided to third parties, for example the vehicle manufacturer, before the next maintenance, the event information can also be transmitted, in particular wirelessly, to a vehicle-external device, for example a back-end server, and processed there. The reaction that can be provided for the compliance of the trigger condition can in particular also depend on the message type.

The output of the warning signal to the user can be particularly useful if the event relevant to monitoring indicates that reliable operation of the motor vehicle is no longer ensured. The user can be asked to stop or interrupt the journey. Equally, however, a corresponding warning signal can also be given to the driver in less drastic cases, for example if a heater of the motor vehicle or the like has to be decommissioned. Such a decommissioning operation should preferably only take place if the function concerned is not relevant to driving or safety. Instead of completely decommissioning a function, it can also be provided in a modified manner, for example parameterized differently. A safe or restricted mode can thus be provided in which a function is only available to a limited extent, whereby, for example, the effect of a malfunction of a specific component can be reduced.

In the method according to the disclosure, it can be provided that the data transmission means comprises different buses and/or networks and/or in that a CAN bus and/or a CAN FD bus and/or a LIN bus and/or a FlexRay bus and/or an I2C bus and/or a Uart bus and/or a PCIe bus and/or an SPI bus and/or an Ethernet is or are used as the data transmission means or as part of the data transmission means. In addition or as an alternative, other buses and/or networks can also be used as data transmission means or as part thereof. If different buses and/or networks are used as part of the data transmission means, messages of a bus-overlapping protocol, for example on the basis of ISO-TP, can be monitored, i.e. in particular taken into consideration as transmitter or receiver messages. Further communication, i.e. the transmitting of the request message and/or the transmitter and/or receiver response, can also take place via the bus-overlapping protocol. In principle, it would also be possible to take messages from the respective individual bus or network into consideration as transmitter and receiver messages, but to transmit the request message and/or the transmitter and/or receiver response via the bus-overlapping protocol. The method according to the disclosure can be implemented as required on different levels of the OSI layer model.

When monitoring a network, for example an Ethernet, the request message can contain address information which depends on which transmitting device generates the transmitter response and/or which receiving device generates the receive response. The address information can in particular relate to the transmitting device-receiving device pair, the communication of which is to be monitored. The basic principles of the buses and networks mentioned are generally familiar to a person skilled in the art and should therefore not be explained.

The method can be implemented on different layers of the OSI layer model. Depending on the layer in which the implementation takes place, individual steps of the method can be implemented in a respective hardware component or software component that implements the corresponding layer. In the case of an implementation on a specific OSI layer, depending on the protocol used to implement the respective layer or by a plurality of the layers, different structural data of the protocols can be accessed through the request message. For example, address information, message IDs, or data content of the messages, for example a counter in bus-overlapping communication, can be taken into consideration when selecting the messages to be taken into consideration. The calculation of the response message can be based, for example, on checksums, hash values, and/or data contents of the messages, the input data used in the calculation being particularly dependent on the OSI layer on which the monitoring is implemented.

As part of a software solution, it can be provided that a monitoring module for generating the transmitter response or the receiver response is implemented in the software of the transmitting device or the receiving device, in particular in a respective controller. Since incoming and outgoing messages are typically initially buffered and, for example, due to different message priorities and a high bus load, the order of the messages can be changed, it is particularly expedient if the transmitter information is determined by a commutative operation, since the transmitter information does not depend on the order of the transmitter responses. This also applies to the receiver information.

In contrast, a hardware solution can provide for the monitoring module to be implemented in the hardware of the transmitting device or the receiving device. In particular if a CAN bus is used as the data transmission means, the monitoring module can be implemented in a CAN control unit of the transmitting device or receiving device, which is in particular an application-specific integrated circuit (ASIC). The problem explained in the context of the software solution regarding changing the order of the incoming and outgoing messages does not arise here, since the transmitter response or receiver response is generated using messages that are detected by the monitoring module in accordance with the actual sequence with which they are transmitted or received. In the context of the hardware solution, the monitoring module can equally be implemented in a transceiver of the transmitting device or receiving device.

The disclosure also relates to a data transmission system comprising at least one transmitting device for transmitting messages, at least one receiving device for receiving the messages, a data transmission means for transmitting the messages and a monitoring device, wherein the data transmission means is, in particular, a vehicle bus or a vehicle network of a motor vehicle, wherein the data transmission system is configured to carry out the method according to any of the preceding claims.

The features described for the method according to the disclosure can be transferred to the data transmission system according to the disclosure with the advantages mentioned.

The disclosure also relates to a motor vehicle comprising the data transmission system described above, wherein the features described for the method or data transmission system according to the disclosure can be transmitted to the motor vehicle according to the disclosure with the advantages mentioned.

Figure 1:
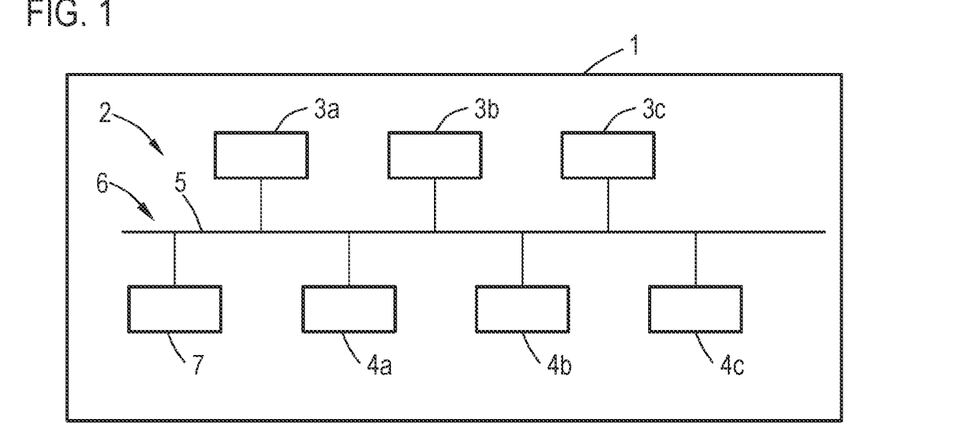
FIG. 1 shows an embodiment of a motor vehicle according to the disclosure.

Further advantages and details of the disclosure shall become apparent from the embodiment described below and by means of the drawings. Schematically, in the drawings:

FIG. 1 shows an embodiment of a motor vehicle according to the disclosure.

Figure 2:
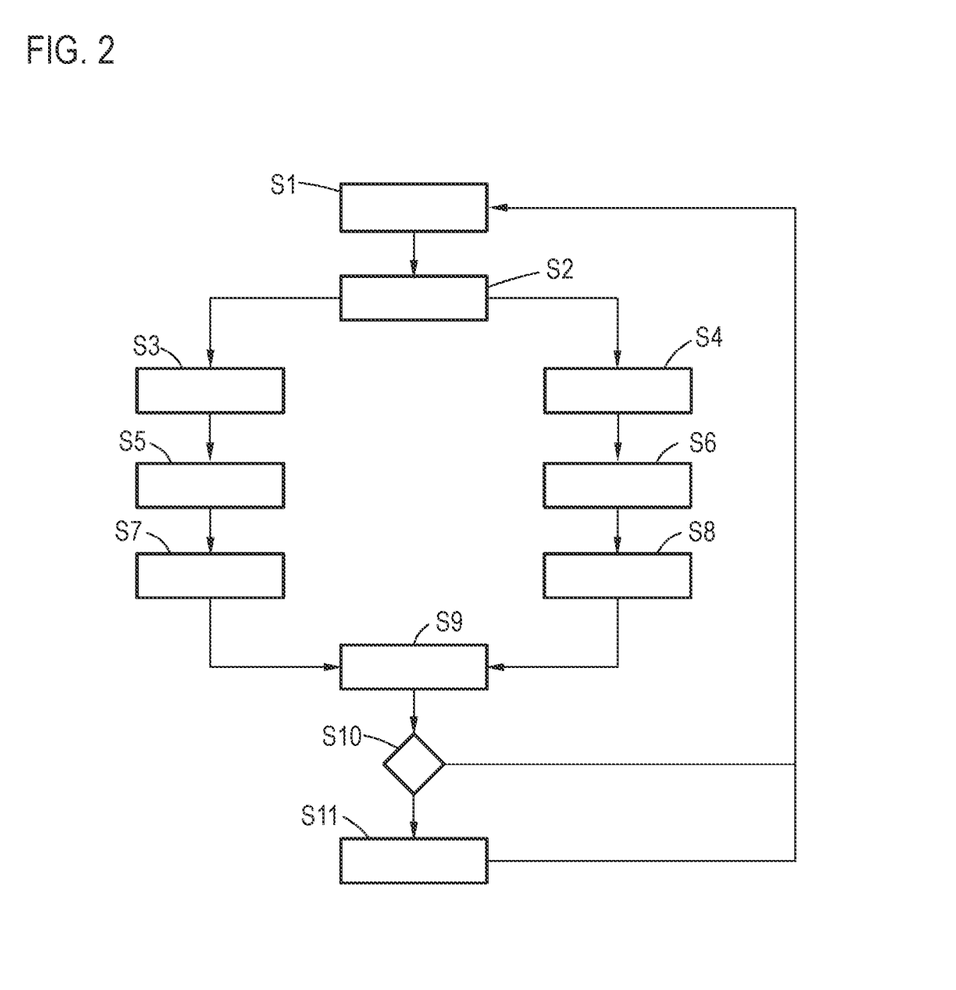
FIG. 2 is a flow diagram of an embodiment of the method according to the disclosure.

FIG. 2 is a flow diagram of an embodiment of the method according to the disclosure.

Figure 3:
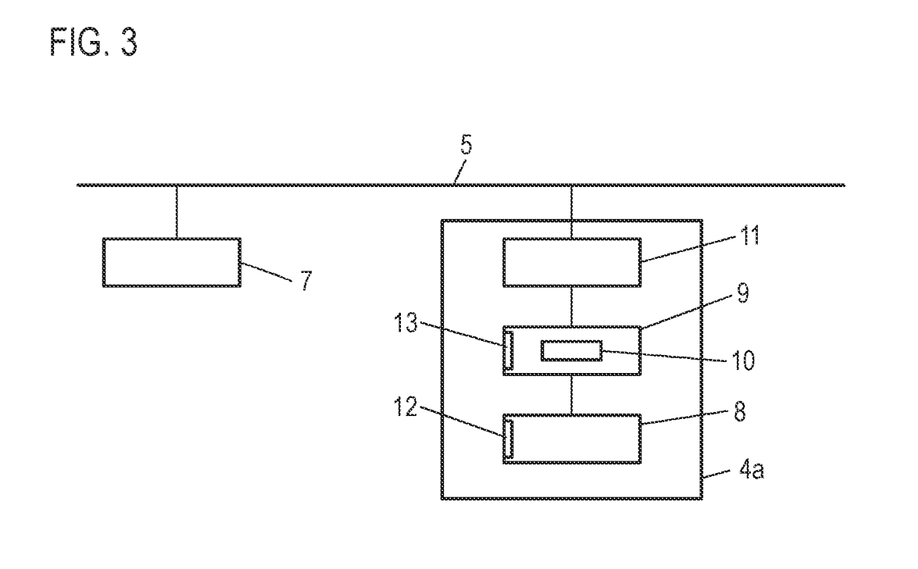
FIG. 3 is a section of the motor vehicle from FIG. 1 with a detailed representation of a receiving device.

FIG. 3 is a section of the motor vehicle from FIG. 1 with a detailed representation of a receiving device.

FIG. 1 schematically shows a motor vehicle 1 comprising a data transmission system 2 having three transmitting devices 3a, 3b, 3c and three receiving devices 4a, 4b, 4c. The number of transmitting devices 3a, 3b, 3c and receiving devices 4a, 4b, 4c is intended only by way of example and can of course differ from this number. Furthermore, a data transmission means 6, embodied as a vehicle bus 5, for example, of the data transmission system 2 is provided, wherein the vehicle bus 5 can be, for example, a CAN bus, a LIN bus, or a PCIe bus. The buses mentioned are intended only by way of example. As explained, other buses, networks, or data transmission systems that comprise different buses and/or networks can also be monitored. Messages transmitted by the transmitting devices 3a, 3b, 3c are transmitted to the receiving devices 4a, 4b, 4c via the vehicle bus 5. Although the transmitting devices 3a, 3b, 3c and the receiving devices 4a, 4b, 4c are only provided for transmitting or receiving messages in the embodiment shown, it is equally conceivable that at least one component connected to the vehicle bus 5 functions both as a transmitting device and as a receiving device. The data transmission means 6 provided as the vehicle bus 5 can equally be a suitable network, in particular an Ethernet. In addition, the data transmission system 2 comprises a monitoring device 7 for monitoring the data transmission system 2, which is connected to the vehicle bus 5 by way of example.

The transmitter messages and receiver messages transmitted via the vehicle bus 5 can typically be messages of a respective message type. Messages of different message types are preferably transmitted via the same vehicle bus 5. Message types can relate to the function of the respective message, for example. For example, a message type can indicate that the transmitter messages or receiver messages are provided for controlling a windshield wiper system.

From this example, it is particularly clear that messages of a specific message type may only be transmitted by parts of the transmitting devices 3a, 3b, 3c and can be received by parts of the receiving devices 4a, 4b, 4c, a specific message type only being related to a specific pair of one of the transmitting devices 3a, 3b, 3c and one of the receiving devices 4a, 4b, 4c in each case. Equally, messages of different message types can also be transmitted or received by the same transmitting device 3a, 3b, 3c or receiving device 4a, 4b, 4c.

The purpose of the present disclosure is to allow for, in particular on a random basis, monitoring of the messages transmitted via the data transmission system 2, in particular with regard to possible malware or sources of errors caused by third-party devices built into the data transmission system 2, in the simplest and least costly manner possible. For this purpose, the monitoring device 7 transmits an example of a request message transmitted as a broadcast to the transmitting devices 3a, 3b, 3c and the receiving devices 4a, 4b, 4c.

Here, the request message comprises, for example, type information relating to the message type of the transmitter messages transmitted by the transmitting devices 3a, 3b, 3c via the vehicle bus 5 or the receiver messages received from the receiving devices 4a, 4b, 4c via the vehicle bus 5. In particular in the event that the data transmission means 6 is a network, for example an Ethernet, the transmitting devices 3a, 3b, 3c and/or the receiving devices 4a, 4b, 4c can each have an assigned network address, the request message comprising address information describing the network address alternatively or in addition to the type information. The type information or the address information determines which of the transmitting devices 3a, 3b, 3c generates a transmitter response and which of the receiving devices 4a, 4b, 4c generates a receiver response, i.e. is affected by the request message. In particular, only those transmitting devices 3a, 3b, 3c or receiving devices 4a, 4b, 4c can be affected by the request message that transmit or receive message types that correspond to the type information and/or that have a network address corresponding to the address information. Unaffected devices can discard the request message immediately. This can already be done by a bus or network controller or by a downstream sub-device, in particular as part of a software solution. In this case, the transmitter response depends on the request message and on at least one transmitter message that is transmitted via the vehicle bus 5 by the transmitting device 3a, 3b, 3c affected by the request message, as will be explained in more detail below. Analogously, the receiver response depends on the request message and on at least one receiver message that is received via the vehicle bus 5 by the receiving device 4a, 4b, 4c affected by the request message.

The transmitter response and the receiver response are transmitted to the monitoring device 7, the monitoring device 7 checking compliance with a trigger condition which depends on the transmitter response and the receiver response, the compliance of which indicates an event relevant to monitoring. The receiver messages, on which the receiver response depends, are expediently selected such that, when the data transmission system 2 is operated as expected, they correspond to the transmitter messages on which the transmitter response depends or such that there is a known relationship between these messages. Consequently, the transmitter response and the receiver response can be used in the context of an evaluation in order to detect a discrepancy between the transmitter messages and the receiver messages. Such a discrepancy can be attributed, for example, to malware or a malfunction in the data transmission system 2 or to a third-party device that is installed in the data transmission system 2, which represents an event relevant to monitoring. The trigger condition is met in particular when it is recognized that the transmitter messages do not arrive at the receiving device 4a, 4b, 4c or are falsified, or that a receiver message was received by the receiving device 4a, 4b, 4c that does not correspond to any transmitter messages transmitted by the transmitting device 3a, 3b, 3c.

This results in particular in the advantage that, in order to detect the event relevant to monitoring, it is not necessary to compare the complete set of transmitter messages with the complete set of receiver messages, but only the transmitter response generated therefrom with the receiver response. In other words, by comparing the transmitter response with the receiver response, a comparison between what was transmitted by the transmitting device 3a, 3b, 3c and what was received by the receiving device 4a, 4b, 4c is made possible in a simple and inexpensive manner. This results in a communication that is comparatively compact for this purpose, since only an exchange of the transmitter response and receiver response is required for checking.

Using the flowchart shown in FIG. 2, the method just explained is further explained in more detail with specific reference to the motor vehicle 1 shown in FIG. 1, in particular with regard to optional details, but without restricting the generality. In a step S1, it is initially provided that the monitoring device 7 generates the request message, which, as already explained, comprises an example of type information or address information.

It is also provided for the request message that it contains, for example, a sampling number, the number of transmitter messages and receiver messages, on which the transmitter response and receiver response depend, depending on the sampling number. The sampling number is advantageously determined or generated randomly. If, for example, the sampling number 126 is randomly generated, this means that 126 transmitter messages as well as receiver messages are used to generate the transmitter response or receiver response. The random selection of the sampling number makes it more difficult for any malware that may be present in the data transmission system 2 to manipulate the monitoring proposed here.

In step S2, the monitoring device 7 encrypts the request message and provides it with an authentication. This has the effect, on the one hand, that unwanted access to the request message from the outside or by a third-party component built into the data transmission system 2 is made more difficult, and that, on the other hand, components 3a, 3b, 3c, 4a, 4b, 4c that receive the request message can ensure on the basis of the authentication that the request message actually comes from the monitoring device 7 and was not generated by malware that may be present in the data transmission system 2.

In the present embodiment, the request message is transmitted, for example, as a broadcast to all transmitting devices 3a, 3b, 3c and receiving devices 4a, 4b, 4c of the data transmission system 2 in step S2. Equally, however, it can be provided in this case that the monitoring device 7 only transmits the request message to selected components 3a, 3b, 3c, 4a, 4b, 4c of the data transmission system 2. The point in time at which the monitoring device 7 transmits the request message to the transmitting devices 3a, 3b, 3c and the receiving devices 4a, 4b, 4c is determined at random. More precisely, the time interval between two successive request messages that are transmitted by the monitoring device 7 is determined randomly.

Each of the transmitting devices 3a, 3b, 3c decrypts the request message in step S3 and each of the receiving devices 4a, 4b, 4c decrypts the request message in step S4, the request message then either being discarded depending on the type information, i.e. the respective transmitting or receiving device does not generate any transmitter or receiver response for the currently received request message, or the described method being continued. After receiving the request message, a confirmation can optionally be transmitted to the monitoring device. In addition, an authentication attached to the request message can also be checked by the transmitting devices 3a, 3b, 3c and the receiving devices 4a, 4b, 4c. Without loss of generality, it is assumed below that only the transmitting device 3a and the receiving device 4a continue the method, since, for example, only these components 3a, 4a transmit or receive messages of the type information contained in the request message. In contrast, the transmitting devices 3b, 3c and the receiving devices 4b, 4c discard the request message and terminate the method at this point. It is equally conceivable that not only one of the transmitting devices 3a, 3b, 3c and receiving devices 4a, 4b, 4c, but two or more of them continue the method according to the disclosure.

In step S5, the transmitting device 3a generates the transmitter response, which comprises a first transmitter information and a second transmitter information. The first and second pieces of transmitter information depend on subsets of the transmitter messages that differ from one another. To explain the first transmitter information and the second transmitter information, it is assumed by way of example that the sampling number is 126, wherein any other suitable numerical value is of course also conceivable. After receiving the request message, the transmitting device 3a transmits a plurality of transmitter messages in succession. The first transmitter information is generated on the basis of the transmitter messages transmitted by the transmitting device 3a, which are transmitted after the request message has been received. The first 126 transmitter messages are used in this case after the request message has been received. As an example, it is provided for the second transmitter information that it is generated on the basis of the second through the 127th of the transmitter message transmitted by the transmitting device after receiving the request message.

According to the same principle, the receiving device 4a generates the receiver response in step S6, which equally comprises a first piece of receiver information and a second piece of receiver information.

This solves the problem that the transmission of the request message to the transmitting device 3a and to the receiving device 4a and/or the respective processing of the request message can take different lengths of time, whereby the transmitter response and the receiver response could be based on a different message set which is overall shifted with regard to the order of transmitting or receiving these messages, thereby possibly resulting in an incorrectly met trigger condition in the course of the further method. Details on this are explained in more detail below.

In principle, it is also conceivable in this case that a third transmitter information of the transmitter response is provided, which depends on the third to the 128th of the transmitter messages transmitted by the transmitting device after receiving the request message. Further transmitter information is conceivable according to this principle. Similarly, third or further pieces of receiver information of the receiver response are equally conceivable.

The two pieces of transmitter information of the transmitter response are determined by a commutative operation from the respective transmitter messages, preferably from individual information fields of the messages, for example from checksums of the respective messages, on the basis of which the transmitter response or the respective transmitter information is generated. Likewise, the two pieces of receiver information of the receiver response are also determined by a commutative operation from the respective receiver messages, on the basis of which the receiver response or the respective receiver information is generated, or from the information fields thereof. Specifically, the first transmitter information, the second transmitter information, the first receiver information, and the second receiver information each represent a checksum that is generated using the principle of redundancy check (CRC) as an example.

In a step S7, the transmitting device 3a encrypts the transmitter response, provides it with an authentication, and transmits it to the monitoring device 7. Similarly, in a step S8, the receiving device 4a encrypts the receiver response, provides it with an authentication, and transmits it to the monitoring device 7. Steps S7 and S8 do not necessarily take place immediately after the transmitter response or receiver response is generated, but preferably with a time delay. By way of example, the time delay is determined randomly, which further complicates manipulation of the monitoring. A maximum can be specified for the random time delay, which is known in particular both in the transmitting or receiving device 3a, 4a and in the monitoring device 7. This makes it possible to combine the random time delay with a timeout for the response, which will be explained later.

In a step S9, the authentication of the transmitter response and the receiver response is checked by the monitoring device 7 and the transmitter response and the receiver response are decrypted by the monitoring device 7 if the authentication is successful.

In a step S10, the monitoring device 7 checks a trigger condition which depends on the transmitter response and the receiver response, the compliance of which indicates an event relevant to monitoring. In this case, it is first checked whether the first transmitter information matches the first receiver information or whether there is a predefined relationship between this information. If this is the case, then the trigger condition is not met and the method can be ended or continued in step S1.

If this is not the case, then, as described above, this discrepancy could not necessarily have been caused by an event relevant to monitoring, but rather the transmission of the request message to the transmitting device 3a could have taken longer, for example, than the transmission of the request message to the receiving device 4a. As a result, the generation of the receiver response by the receiving device 4a began earlier than the generation of the transmitter response by the transmitting device 3a. This time difference can lead to the receiver response being related to a set of receiver messages shifted by one message in relation to the set of transmitter messages on the basis of which the first transmitter information is generated. If this is the case, however, then the second receiver information matches the first transmitter information. In order to recognize this, if the first transmitter information does not match the first receiver information or does not have the specified relationship, the first transmitter information is then compared with the second receiver information and the second transmitter information is compared with the first receiver information. The trigger condition is met if none of the transmitter information matches any of the receiver information or has the specified relationship, since only then can an event relevant to monitoring be assumed, such as that transmitter messages have been manipulated by malware or the receiver messages have been generated by third-party devices.

In summary, the trigger condition can only be met, for example, if the first transmitter information does not match the first receiver information or does not have a predefined relationship, if the first transmitter information does not match the second receiver information or does not have a predefined relationship, if the second transmitter information does not match the first receiver information or does not have a predefined relationship, and if the second transmitter information does not match the second receiver information or does not have a predefined relationship. If this is the case, then in a step S11 it is provided that, as a measure, for example logging of event information describing the event relevant to monitoring, takes place. When the motor vehicle 1 is being serviced, this log can be read out accordingly. As an alternative or in addition to logging in the motor vehicle, the event information can be transmitted to a vehicle-external device, for example a back-end server of the vehicle manufacturer. As a measure, it can alternatively be provided in particular that a warning signal is output to a user or driver of the motor vehicle 1 in the case of compliance with the trigger condition, and, if a function of the motor vehicle 1 that is not relevant to driving or safety is affected, the function affected by the event relevant to monitoring is decommissioned. As an alternative to the complete decommissioning of a function, the function could be provided in a secure or restricted mode, for example by means of an adapted parameterization. If monitoring takes place for different message types, the measure taken in the case of compliance with the trigger condition can also depend on the message type for which the trigger condition is met.

The method can be repeated automatically at fixed or variable time intervals from step S1 or can be carried out in parallel for different message types. The intervals between repetitions can be different for different message types. The repetition can take place after receiving the transmitter and receiver response, but also after a timeout. For example, the absence of a response from a transmitting or receiving device for a predetermined time interval in the monitoring device can trigger a timeout, which indicates that this device is unlikely to receive a response. In this case, it can be assumed in particular that an event relevant to monitoring is present and corresponding reactions can be triggered, as was explained in the case of compliance with the trigger condition. If a timeout is present, other reactions can take place in the case of compliance with the trigger condition, for example logging on the one hand and a function release on the other. In addition or as an alternative, a new request message relating to the transmitting or receiving device triggering the timeout can be transmitted immediately or after a waiting time.

Finally, FIG. 3 shows a detailed view of a receiving device 4a, with the aid of which exemplary possibilities for generating the receiver response in the receiving device 4a are explained, whereby this principle can also be transferred to the receiving devices 4b, 4c and the transmitting devices 3a, 3b, 3c. In this example, the receiving device 4a is connected to the monitoring device 7 via a vehicle bus 5 designed as a CAN bus. The two exemplary possibilities can be referred to as a hardware solution and a software solution.

The receiving device 4a comprises a control device 8 for controlling the operation of the receiving device 4a, for example for operating an actuator assigned to the function of the receiving device 4a, for example an electromechanical actuator, and a CAN control unit 9 for controlling the transmission process of the receiver messages between the vehicle bus 5 and the receiving device 4a. The CAN control unit 9 is an example of an application-specific integrated circuit (ASIC). Furthermore, the receiving device 4a comprises a message buffer 10 for temporarily storing receiver messages received via the vehicle bus 5 and a transceiver 11 as an interface for transmitting the receiver messages from the vehicle bus 5 to the receiving device 4a. The CAN control unit 9 and the message buffer 10 are present as a common structural unit in the receiving device 4a, the provision of the receiver messages stored in the message buffer 10 to the control device 8 being controlled by the CAN control unit 9. Typically, receiver messages with a higher priority are preferably transmitted to the control device 8 over receiver messages with a lower priority, whereby the order in which the receiver messages are transmitted to the control device 8 may differ from the order in which the receiver messages arrive at the receiving device 8a.

As part of a software solution, a monitoring module 12 for generating the receiver response can be implemented in the control device 8 of the receiving device 4a. In some application cases, for example when messages with different priorities are transmitted on CAN buses, the problem arises that the sequence—in which the receiver messages are received by the control device 8 and on the basis of which the receiver response is generated, due to the intermediate storage in the message buffer 10—can be distinguished from the sequence with which the receiver messages actually arrive at the receiving device 4a. This could result in different checksums due to the different sequences, which can possibly lead to an incorrect compliance with the trigger condition. This problem can be avoided or at least contained by providing a commutative operation for generating the checksum, in which the sequence of the messages naturally does not matter.

In contrast, a hardware solution can provide that instead of the monitoring module 12 in the control device 8, a monitoring module 13 is implemented in the CAN control unit 9 of the receiving device 4a. Since the generation of the receiver response is based on receiver messages, the sequence of which has not yet changed due to the buffering of the messages in the message buffer 10, the problem of different checksums present in the software solution due to different sequences of the messages does not arise. In this case, non-commutative generation methods for the checksum, in particular using an S-box, are therefore also conceivable. In this regard, the same effect can be achieved if the monitoring module is implemented in a location of the receiving device 4a on the bus side with respect to the message buffer, in particular in the transceiver 11.

The invention claimed is:

1. A method for monitoring a data transmission system comprising a transmitting device for transmitting messages, a receiving device for receiving the messages, a data transmission means for transmitting the messages and a monitoring device, wherein the data transmission means comprise a vehicle bus or a vehicle network of a motor vehicle, the method comprising:

transmitting, by the monitoring device, a request message to the transmitting device and to the receiving device;

transmitting, by the transmitting device, a transmitter message via the data transmission means;

generating, by the transmitting device, a transmitter response based on the request message and the transmitter message;

transmitting, by the transmitting device, the transmitter response to the monitoring device;
receiving, by the receiving device, a receiver message via the data transmission means;
generating, by the receiving device, a receiver response based on the request message and the receiver message;
transmitting, by the receiving device, the receiver response to the monitoring device;
receiving, by the monitoring device, the transmitter response and the receiver response; and
determining, by the monitoring device, compliance with a trigger condition based on the transmitter response and the receiver response, wherein the compliance indicates a monitoring event.

2. The method according to claim 1, further comprising:
encrypting, by the monitoring device, the request message;
authenticating, by the monitoring device, the request message to the transmitting device and/or the receiving device;
encrypting, by the transmitting device, the transmitter response;
authenticating, by the transmitting device, the transmitter response to the monitoring device;
encrypting, by the receiving device, the receiver response; and
authenticating, by the receiving device, the receiver response to the monitoring device.

3. The method according to claim 1, wherein the data transmission system comprises a plurality of transmitting devices and receiving devices, the method further comprising broadcasting, by the monitoring device, the request message to the plurality of transmitting devices and receiving devices of the data transmission system.

4. The method according to claim 1, wherein the request message comprises type information describing a message type, the method further comprising:
determining, by the transmitting device, the message type based on the request message;
determining, by the transmitting device, that the transmitter message corresponds to the message type;
transmitting, by the transmitting device, the transmitter message;
generating, by the transmitting device, the transmitter response based on the type information;
determining, by the receiving device, the message type based on the request message;
determining, by the receiving device, that the receiver message corresponds to the message type;
receiving, by the receiving device, the receiver message; and
generating, by the receiving device, the receiver response based on the type information.

5. The method according to claim 1, wherein the request message comprises at least one address information describing a network address, the method further comprising:
determining, by the transmitting device, that the network address corresponds to an assigned network address of the transmitting device;
transmitting, by the transmitting device, the transmitter message via the data transmission means in response to the determining that the network address corresponds to the assigned network address of the transmitting device;
generating, by the transmitting device, the transmitter response in response to the determining that the network address corresponds to the assigned network address of the transmitting device;
determining, by the receiving device, that the network address corresponds to an assigned network address of the receiving device;
receiving, by the receiving device, the receiver message via the data transmission means in response to the determining that the network address corresponds to the assigned network address of the receiving device; and
generating, by the receiving device, the receiver response in response to the determining that the network address corresponds to the assigned network address of the receiving device.

6. The method according to claim 1, wherein the request message comprises a sampling number, the method further comprising:
determining, by the transmitting device, a number of transmitter messages based on the sampling number;
generating, by the transmitting device, the transmitter response based on the number of transmitter messages;
determining, by the receiving device, a number of receiver messages based on the sampling number; and
generating, by the receiving device, the receiver response based on the number of receiver messages.

7. The method according to claim 1, further comprising:
transmitting, by the transmitting device, a plurality of transmitter messages in succession;
generating, by the transmitting device, a first transmitter information based on a first group of transmitter messages of the plurality of transmitter messages;
generating, by the transmitting device, a second transmitter information based on a second group of transmitter messages of the plurality of transmitter messages, wherein the second group of transmitter messages include at least one transmitter message that is transmitted subsequently to the first group of transmitter messages;
generating, by the transmitting device, the transmitter response to include the first and the second transmitter information;
receiving, by the receiving device, a plurality of receiver messages in succession;
generating, by the receiving device, a first receiver information based on a first group of receiver messages of the plurality of receiver messages;
generating, by the receiving device, a second receiver information based on a second group of receiver messages of the plurality of receiver messages, wherein the second group of receiver messages include at least one receiver message that is received subsequently to the first group of receiver messages; and
generating, by the receiving device, the receiver response to include the first and the second receiver information.

8. The method according to claim 1, further comprising:
determining, by the monitoring device, a time interval and a sampling number randomly;
transmitting, by the monitoring device, the request message to the transmitting device and to the receiving device, wherein the request message includes the sampling number;
waiting, by the monitoring device, for the time interval; and
transmitting, by the monitoring device, a second request message to the transmitting device and to the receiving device, wherein the second request message includes the sampling number.

9. The method according to claim 1, further comprising:
transmitting, by the transmitting device, the transmitter response to the monitoring device after a lapse of a waiting time after the generating the transmitter response; and
transmitting, by the receiving device, the receiver response to the monitoring device after the lapse of the waiting time after the generating the receiver response.

10. The method according to claim 9, wherein the waiting time is fixed or determined randomly.

11. The method according to claim 1, further comprising:
transmitting, by the transmitting device, transmitter messages;
generating, by the transmitting device, one or more transmitter information by applying a commutative operation to at least parts of the transmitter messages on which the transmitter response depends or to information fields of the at least parts of the transmitter messages;
generating, by the transmitting device, the transmitter response to include the one or more transmitter information;
receiving, by the receiving device, receiver messages;
generating, by the receiving device, one or more receiver information by applying the commutative operation to at least parts of the receiver messages on which the receiver response depends or to information fields of the at least parts of the receiver messages;
generating, by the receiving device, the receiver response to include the one or more receiver information; and
determining, by the monitoring device, that the trigger condition is met if none of the one or more transmitter information matches or has a specified relationship with one of the one or more receiver information.

12. The method according to claim 1, wherein the determining the compliance with the trigger condition further comprises:
logging event information describing an event relevant to monitoring;
transmitting the event information to a vehicle-external device;
outputting a warning signal to a user, wherein the user includes a driver of the motor vehicle, wherein the motor vehicle comprises the data transmission means; and
decommissioning and/or modifying a function affected by the event relevant to monitoring, wherein the function is a vehicle function of the motor vehicle.

13. The method according to claim 1, wherein the data transmission means comprises a plurality of buses comprising a CAN bus, a CAN FD bus, a LIN bus, a FlexRay bus, an I2C bus, a Uart bus, a PCIe bus, and/or an SPI bus and/or networks comprising an Ethernet.

14. A data transmission system comprising a transmitting device for transmitting messages, a receiving device for receiving the messages, a data transmission means for transmitting the messages, and a monitoring device, the data transmission system configured to:
transmit, by the monitoring device, a request message to the transmitting device and to the receiving device;
transmit, by the transmitting device, a transmitter message via the data transmission means;
generate, by the transmitting device, a transmitter response based on the request message and the transmitter message;
transmit, by the transmitting device, the transmitter response to the monitoring device;
receive, by the receiving device, a receiver message via the data transmission means;
generate, by the receiving device, a receiver response based on the request message and the receiver message;
transmit, by the receiving device, the receiver response to the monitoring device;
receive, by the monitoring device, the transmitter response and the receiver response; and
determine, by the monitoring device, compliance with a trigger condition based on the transmitter response and the receiver response, wherein the compliance indicates a monitoring event,
wherein the data transmission means is a vehicle bus or a vehicle network of a motor vehicle.

15. A motor vehicle comprising a data transmission system, wherein the data transmission system comprises a transmitting device for transmitting messages, a receiving device for receiving the messages, a data transmission means for transmitting the messages, and a monitoring device, the motor vehicle configured to:
transmit, by the monitoring device, a request message to the transmitting device and to the receiving device;
transmit, by the transmitting device, a transmitter message via the data transmission means;
generate, by the transmitting device, a transmitter response based on the request message and the transmitter message;
transmit, by the transmitting device, the transmitter response to the monitoring device;
receive, by the receiving device, a receiver message via the data transmission means;
generate, by the receiving device, a receiver response based on the request message and the receiver message;
transmit, by the receiving device, the receiver response to the monitoring device;
receive, by the monitoring device, the transmitter response and the receiver response; and
determine, by the monitoring device, compliance with a trigger condition based on the transmitter response and the receiver response, wherein the compliance indicates a monitoring event.

\* \* \* \* \*